US007653824B2

(12) United States Patent
Rangarajan et al.

(10) Patent No.: US 7,653,824 B2
(45) Date of Patent: Jan. 26, 2010

(54) SYSTEM AND METHOD OF MANAGING HEAT IN MULTIPLE CENTRAL PROCESSING UNITS

(75) Inventors: Madhusudhan Rangarajan, Round Rock, TX (US); Timothy M. Lambert, Austin, TX (US); Allen C. Wynn, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 510 days.

(21) Appl. No.: 11/498,920

(22) Filed: Aug. 3, 2006

(65) Prior Publication Data

US 2008/0034232 A1   Feb. 7, 2008

(51) Int. Cl.
*G06F 1/00* (2006.01)
*G06F 1/26* (2006.01)
(52) U.S. Cl. .................. 713/300; 713/310; 713/320; 713/321; 713/322; 713/323; 713/324; 713/330; 713/340
(58) Field of Classification Search .................. 713/300, 713/310, 320–324, 330, 340
See application file for complete search history.

(56) References Cited

U.S. PATENT DOCUMENTS

| 5,502,838 | A | * | 3/1996 | Kikinis | ........................ 713/501 |
| 6,804,632 | B2 | * | 10/2004 | Orenstien et al. | ........... 702/188 |
| 6,826,456 | B1 | * | 11/2004 | Irving et al. | ................ 700/299 |
| 7,349,762 | B2 | * | 3/2008 | Omizo et al. | ............... 700/278 |
| 7,454,631 | B1 | * | 11/2008 | Laudon et al. | ............... 713/300 |
| 2003/0110012 | A1 | | 6/2003 | Orenstien et al. | |
| 2004/0128663 | A1 | | 7/2004 | Rotem | |
| 2006/0136074 | A1 | * | 6/2006 | Arai et al. | ...................... 700/2 |
| 2007/0231119 | A1 | * | 10/2007 | Shen et al. | .................... 415/47 |

* cited by examiner

*Primary Examiner*—Abdelmoniem Elamin
(74) *Attorney, Agent, or Firm*—Larson Newman & Abel, LLP

(57) ABSTRACT

An information handling system is disclosed and can include at least one memory and at least two processor cores coupled thereto. Further, the information handling system can include a controller coupled to the at least two processor cores and the at least one memory. The controller can monitor the temperature within each processor core. Based on the temperature the controller can selectively steer one or more program threads away from an overheating processor core.

18 Claims, 3 Drawing Sheets

SYSTEM AND METHOD OF MANAGING HEAT IN MULTIPLE CENTRAL PROCESSING UNITS

FIELD OF THE DISCLOSURE

The present disclosure relates generally to distributed file systems. More specifically, the present disclosure relates to managing multiple central processing units in a distributed file system to reduce or prevent problems associated with heat.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can further include one or more central processing units. During use, each central processing unit (CPU) may heat up due to the amount of energy required to power the CPU. Unfortunately, as a CPU heats up the efficiency of the CPU may be substantially decreased. Further, if a CPU heats up to a critical temperature, the CPU may be damaged. Accordingly, it is desirable to prevent one or more CPUs within a distributed file system from overheating.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

An information handling system is disclosed and can include at least one memory and at least two processor cores coupled thereto. Further, the information handling system can include a controller coupled to the at least two processor cores and the at least one memory. The controller can monitor the temperature within each processor core. Based on the temperature the controller can selectively steer one or more program threads away from an overheating processor core.

In another embodiment, a method of managing a plurality of processor cores in an information handling system is disclosed. The method can include monitoring a temperature associated with each of the plurality of processor cores, determining whether any of the plurality of processor cores is an overheating processor core, and steering one or more program threads away from the overheating processor core when the temperature of the overheating processor core is greater than a pre-critical threshold.

In yet another embodiment, a controller for an information handling system is disclosed. The controller can include logic to monitor a temperature associated with each of the plurality of processor cores and determine whether any of the plurality of processor cores is an overheating processor core. Further, the controller can include logic to steer one or more program threads away from the overheating processor core when the temperature of the overheating processor core is greater than a pre-critical threshold.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on dynamically changing file types within a distributed file systems. While the teachings may certainly be utilized in this application, the teachings may also be utilized in other applications and with several different types of architectures such as distributed computing architectures, client/server architectures, or middleware server architectures.

Figure 1:
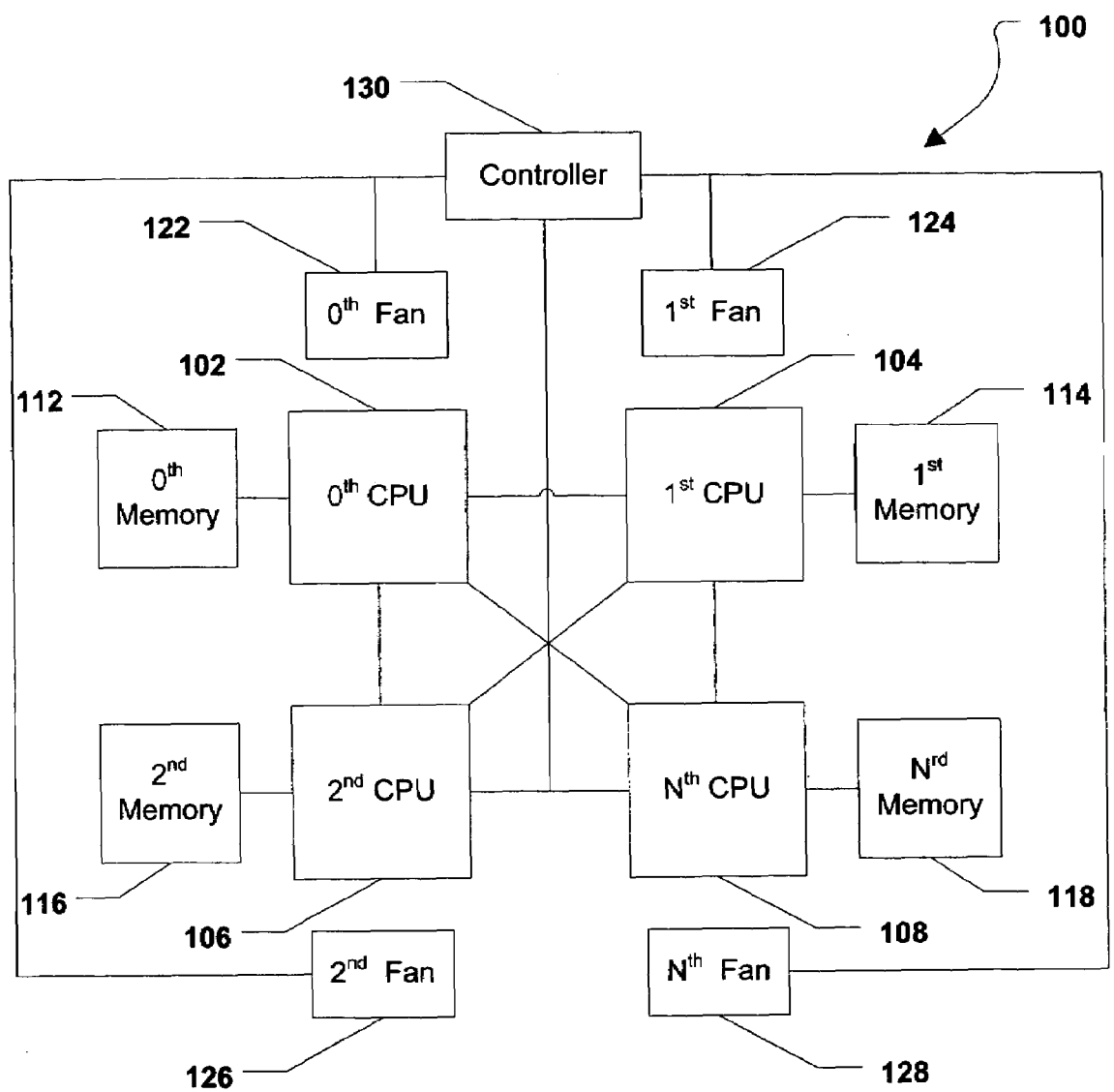
FIG. 1 is a general diagram illustrating a first embodiment of an information handling system.

Referring initially to FIG. 1, a first embodiment of an information handling system is shown and is generally designated 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In a particular embodiment, as shown in FIG. 1, the information handling system 100 can include a zeroth CPU 102, a first CPU 104, a second CPU 106, and an Nth CPU 108. As shown, the CPUs 102, 104, 106, 108 can be interconnected. In particular, the zeroth CPU 102 can be connected to the first CPU 104, the second CPU 106, and the Nth CPU 108. Further, the first CPU 104 can be connected to the zeroth CPU 102, the second CPU 106, and the Nth CPU 108. The second CPU 106 can be connected to the zeroth CPU 102, the first CPU 104, and the Nth CPU 108. Also, the Nth CPU 108 can be connected to the zeroth CPU 102, the first CPU 104, and the second CPU 106. In a particular embodiment, the CPUs 102, 104, 106, 108 can be interconnected via a bus, a network, or other suitable means.

As illustrated in FIG. 1, a zeroth memory 112 can be connected to the zeroth CPU 102. A first memory 114 can be connected to the first CPU 104. A second memory 116 can be connected to the second CPU 106. Additionally, an Nth memory 118 can be connected to the Nth CPU 108. Each memory can provide storage for one or more files within the information handling system.

FIG. 1 further indicates that the information handling system 100 can include a zeroth fan 122 that can be placed adjacent, or proximate, to the zeroth CPU 102. A first fan 124 can be placed adjacent, or proximate, to the first CPU 104. A second fan 126 can be placed adjacent, or proximate, to the second CPU 106. Further, an Nth fan 128 can be placed adjacent, or proximate, to the Nth CPU 108. Each fan 122, 124, 126, 128 can blow air directly on a corresponding CPU 102, 104, 106, 108 in order to reduce the temperature the CPU 102, 104, 106, 108. Further, each fan 122, 124, 126, 128 can be a multi-speed fan and the speed of each fan 122, 124, 126, 128 can be controlled by an external controller, described below.

In a particular embodiment, a controller 130 can be connected to each CPU 102, 104, 106, 108 and each fan 122, 124, 126, 128. The controller 130 can include logic for monitoring a temperature of each CPU 102, 104, 106, 108 and managing the operation of each CPU 102, 104, 106, 108 and the operation of each fan 122, 124, 126, 128 based on the temperature. As described in greater detail below, the logic can include one or more instructions that will allow the controller 130 to steer program threads away from a CPU 102, 104, 106, 108 that is heating up in order allow the CPU in question to temporarily go off-line in order to cool off. In a particular embodiment, the system 100 shown in FIG. 1 can be considered a non-uniform memory access (NUMA) system.

Figure 2:
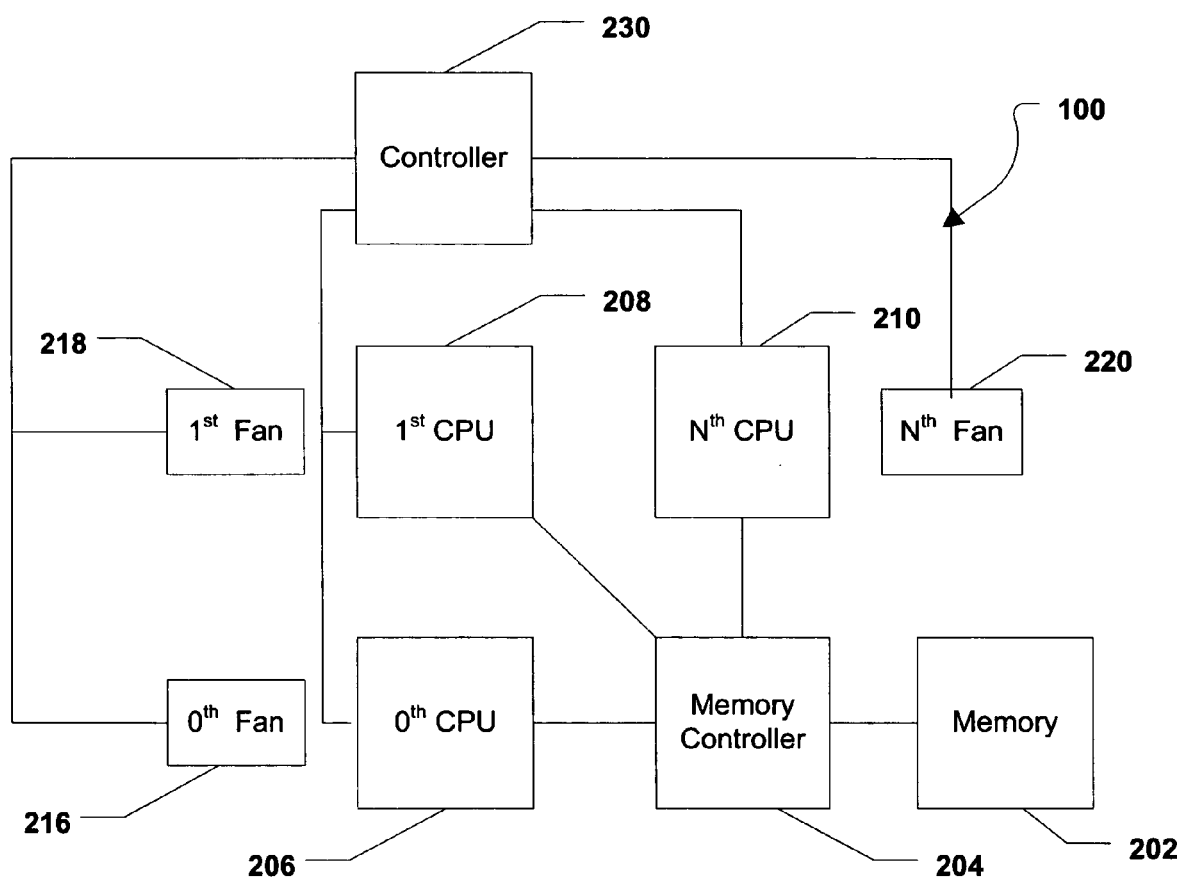
FIG. 2 is a general diagram illustrating a second embodiment of an information handling system.

Referring to FIG. 2, a second embodiment of an information handling system is shown and is generally designated 200. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As shown in FIG. 2, the information handling system 200 can include a memory 202. A memory controller 204 can be coupled to the memory 202. Further, a zeroth CPU 206, a first CPU 208, and an Nth CPU 210 can be connected to the memory. During operation, the CPUs 206, 208, 210 can execute one or more program threads in order to store files within the memory 202 and manipulate, e.g., read or write, data within those same files.

FIG. 2 also shows that the information handling system 200 can include a zeroth fan 216 that can be placed adjacent, or proximate, to the zeroth CPU 206. A first fan 218 can be placed adjacent, or proximate, to the first CPU 208. Further, an Nth fan 220 can be placed adjacent, or proximate, to the Nth CPU 208. Each fan 216, 218, 220 can blow air directly on a corresponding CPU 206, 208, 210 in order to reduce the temperature the CPU 206, 208, 210. A baseboard management controller 230 can be coupled to each CPU 206, 208, 210 and to each fan 216, 218, 220. Each fan 216, 218, 220 can be a multi-speed fan and the baseboard management controller 230 can control the speed of each fan 216, 218, 220. In lieu of a baseboard management controller 230, the system 200 can include a service processor (not shown) that can perform one or more of the functions of the baseboard management controller 230.

In a particular embodiment, the baseboard management controller 230 can include logic for monitoring a temperature of each CPU 206, 208, 210 and managing the operation of each CPU 206, 208, 210 based on the temperature. As described in greater detail below, the logic can include one or more instructions that will allow the baseboard management controller 230 to steer program threads away from a CPU 206, 208, 210 that is heating up in order allow the CPU in question to temporarily go off-line in order to cool off. In a particular embodiment, the system 200 shown in FIG. 2 can be considered a non-NUMA system.

Figure 3:
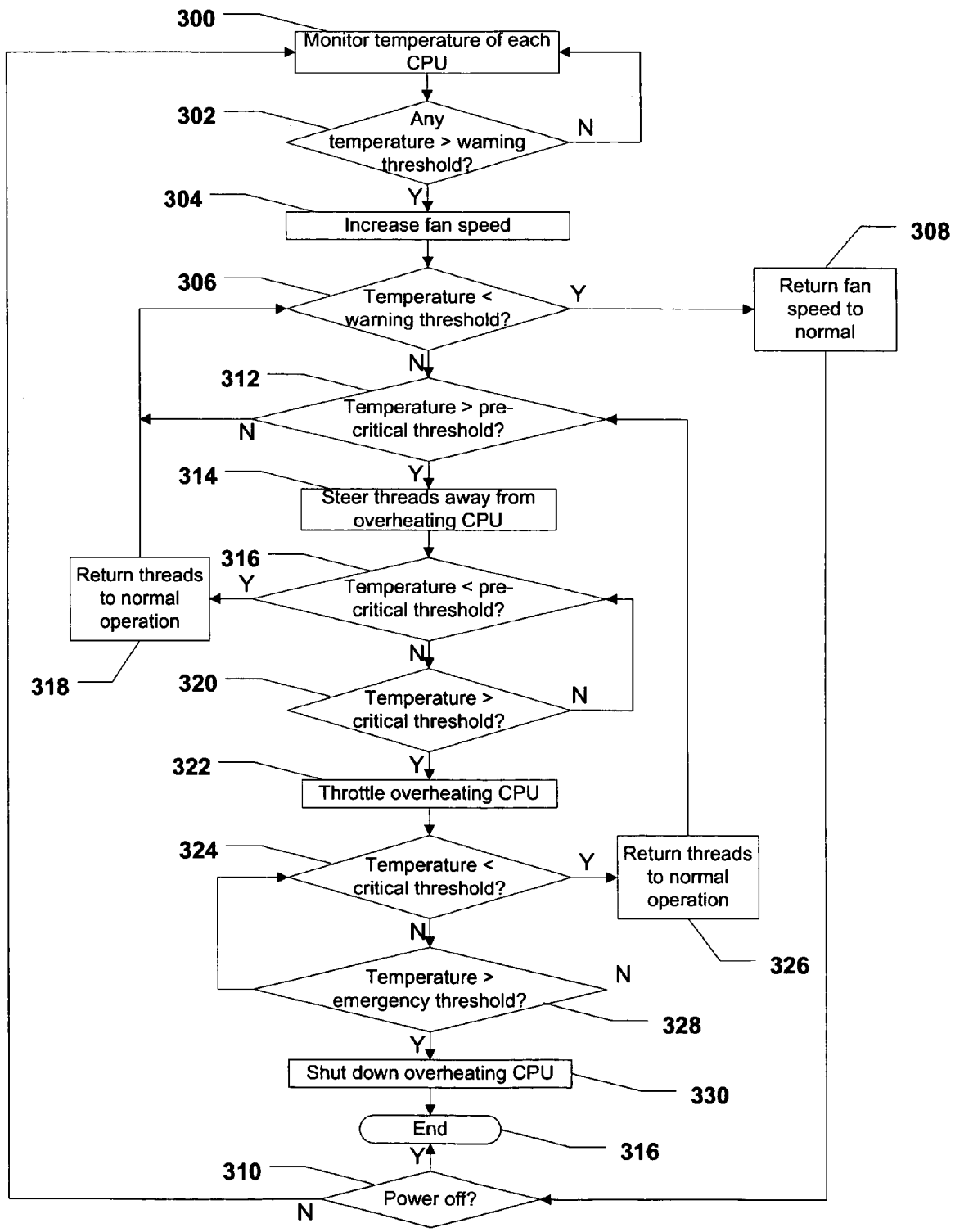
FIG. 3 is a flow chart illustrating a method of managing a plurality of central processing units in an information handling system to prevent any of the central processing units from overheating.

Referring to FIG. 3, a method of managing a plurality of central processing units within an information handling system to prevent any of the central processing units from overheating is shown and commences at block 300. Each CPU can include a single processor core or multiple processor cores, e.g., dual cores, quad cores, etc. As such, the method can be used to control a plurality of CPUs, a plurality of processor cores, or a combination thereof.

At block 300, a controller monitors a temperature of each CPU, or processor core. At decision step 302, the controller determines whether the temperature of any CPU is greater than a warning threshold. If not, the method returns to block 300 and the controller can continue to monitor the temperature of each CPU. Conversely, if the temperature of any CPU is greater than the warning threshold, the method can proceed to block 304 and the controller can increase the speed of a fan adjacent to the CPU that is heating up.

Proceeding to decision step 306, the controller can determine whether the temperature of the CPU in question has fallen below the warning threshold. If so, the method can move to block 308 and the controller can return the speed of the fan to a normal operation setting. Alternatively, the controller may turn the fan off. From block 308, the method can move to decision step 310 and the controller can determine whether the information handling system is powered off. If the information handling system is power off, the method can end at state 312. Otherwise, the method can return to block 300 and the controller can continue to monitor the temperature of each CPU within the information handling system.

Returning to decision step 306, if the controller determines that the temperature of the CPU has not fallen below the warning threshold, the method can proceed to decision step 314. At decision step 314, the controller can determine whether the temperature of the CPU has risen above a pre-critical threshold. If not, the method can return to decision step 306 and continue as described herein. On the other hand, at decision step 314, if the temperature of the CPU is greater than the pre-critical threshold, the method can move to block 316 and the controller can steer one or more program, or application, threads away from the overheating CPU. Steering the program threads away from the overheating CPU can allow the overheating CPU to temporarily go off-line and allow the overheating CPU to cool.

In a particular embodiment, the controller can steer the program threads away from the overheating CPU by generating a system management interrupt (SMI) and instructing the basic input/output system (BIOS) to move all of the system memory relatively far away from the overheating CPU in an advanced configuration and power interface (ACPI) static resource affinity table (SRAT). Thereafter, the operating system (OS) can be notified to update the SRAT and the OS can use the overheating CPU less than the other CPUs allowing the overheating CPU to cool down. Later, after the overheating cools, another SMI can be issued and the SRAT can be restored to the previous state. The OS can be notified of the dynamic SRAT updates through the serial communication interface (SCI). In addition to, or in lieu of, an ACPI system locality information table (SLIT) can be modified similar to the SRAT in order to move the system memory away from the overheating CPU.

Proceeding to decision step 318, the controller can determine whether the temperature of the overheating CPU has fallen below the pre-critical threshold in response to steering the threads away from the overheating CPU. If so, the method can continue to block 320 and the controller can return the CPU to normal operation and cease the thread steerage. Thereafter, the method can return to decision step 306 and continue as described herein.

Returning to decision step 318, if the temperature of the overheating CPU has not fallen below the pre-critical threshold, the method can move to decision step 322. At decision step 322, the controller can determine whether the temperature of the overheating CPU is greater than a critical threshold. If not, the method can return to decision step 318 and continue as described herein. Otherwise, if the temperature of the overheating CPU is greater than the critical threshold, the method can move to block 324 and the controller can throttle the overheating CPU. In a particular embodiment, the controller can throttle the overheating CPU by reducing the clock speed of the CPU, which, in turn, can reduce the heat output of the CPU. In a particular embodiment, throttling the overheating CPU can allow the overheating CPU to cool down. However, throttling the overheating CPU can reduce the speed at which program threads are processed.

Continuing to decision step 326, the controller can determine whether the temperature of the overheating CPU has fallen below the critical threshold in response to the throttling. If the temperature of the overheating CPU has fallen below the critical threshold, the method can move to block 328 and the controller can return the CPU to normal operation. Conversely, if the temperature of the overheating CPU has not fallen below the critical threshold, the method can proceed so decision step 330. At decision step 330, the controller can determine whether the temperature of the overheating CPU is greater than emergency threshold. If the temperature of the overheating CPU rises above the emergency threshold, the method can move to block 332 and the controller can shut down the overheating CPU. Thereafter, the method can end at state 312.

Returning to decision step 330, if the temperature of the overheating CPU is not greater than the emergency threshold, the method can return to decision step 326 and continue as described herein.

With the configuration of structure described herein, the system and method of managing heat within multiple central processing units can provide four layers of protection for each CPU within an information handling system. For example, a first layer of protection, e.g., a warning layer, can be provided and if the temperature of a CPU within the information handling system rises above a warning threshold, a controller within the system can increase the speed of a fan adjacent to the CPU. The system can also provide a second layer of protection, e.g., a pre-critical layer, and if the temperature of the CPU continues to rise above a pre-critical threshold, the controller can steer one or more threads away from the CPU and effectively force the CPU to go off-line to allow the CPU to cool. Further, the system can provide a third layer of protection, e.g., a critical layer, and if the temperature of the CPU rises above a critical threshold, the controller can throttle the CPU in order to allow the CPU a chance to cool. Additionally, the system can provide a fourth layer of protection, e.g., an emergency layer, and if the temperature of the CPU rises above an emergency threshold, the controller can shut down the overheating CPU to allow the overheating CPU to cool.

The present method can use an ACPI SRAT to "fool" an OS into re-prioritizing thread allocation based on memory affinity. The OS does not need to be aware of any thermal factors. The BIOS can control the CPUs for the OS by changing the SRAT. Further, the present method can dynamically shift a load on an overheated processor to another processor using dynamic SRAT updates. These updates can induce the OS to allocate threads to one or more CPUs that have "closer" memory. This allocation can allow the overheating processor to cool.

The method described herein can be used to manage heat within multiple processors of an information handling system. Additionally, the method can be applied to an information handling system having a single CPU system with dual or quad cores where there are two or four thermal domains, or processor cores, within the CPU that can heat up independently.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   at least one memory;
   at least two processor cores coupled to the memory; and
   a controller coupled to the at least one memory and the at least two processor cores, wherein the controller monitors a temperature within each processor core and based on the temperature, the controller selectively steers one or more program threads away from an overheating processor core by instructing a basic input/output system (BIOS) to move at least a portion of system memory away from the overheating processor core in an advanced configuration and power interface (ACPI) table, and the controller increases a speed of a fan adjacent to the overheating processor core based on the overheating processor core being above a warning threshold.

2. The system of claim 1, wherein the controller comprises logic to:
monitor the temperature associated with each processor core;
determine whether any processor core is an overheating processor core; and
steer one or more program threads away from the overheating processor core when the temperature of the overheating processor core is greater than a pre-critical threshold.

3. The system of claim 2, wherein the controller further comprises logic to:
return the one or more program threads to normal operation when the temperature of the overheating processor core falls below the pre-critical threshold.

4. The system of claim 1, wherein the ACPI table comprises an ACPI static resource affinity table (SRAT), an ACPI system locality information table (SLIT), or a combination thereof.

5. The system of claim 1, wherein the controller further comprises logic to:
generate a system management interrupt (SMI) to instruct the BIOS.

6. The system of claim 1, wherein the controller further comprises logic to:
notify an operating system (OS) to update the ACPI table.

7. The system of claim 3, wherein the controller further comprises logic to:
generate another SMI in order to restore the ACPI table to a configuration prior to the temperature increasing beyond the pre-critical threshold.

8. A method of managing a plurality of processor cores in an information handling system, comprising:
monitoring a temperature associated with each of the plurality of processor cores;
determining whether any of the plurality of processor cores is an overheating processor core;
determining whether the temperature of the overheating processor core is above a warning threshold;
increasing a speed of a fan adjacent to the overheating processor core that is above the warning threshold; and
steering one or more program threads away from the overheating processor core by instructing a basic input/output system (BIOS) to move at least a portion of system memory away from the overheating processor core in an advanced configuration and power interface (ACPI) table when the temperature of the overheating processor core is greater than a pre-critical threshold.

9. The method of claim 8, further comprising returning the one or more program threads to normal operation when the temperature of the overheating processor core falls below the pre-critical threshold.

10. The method of claim 8, further comprising notifying an operating system (OS) to update the ACPI table.

11. The method of claim 9, wherein the one or more program threads is returned to normal operation by:
generating another SMI in order to restore the SRAT to a configuration prior to the temperature increasing beyond the pre-critical threshold.

12. A controller for an information handling system, the controller comprising logic to:
monitor a temperature associated with each of the plurality of processor cores;
determine whether any of the plurality of processor cores is an overheating processor core;
determine whether the temperature of the overheating processor core is above a warning threshold;
increase a speed of a fan adjacent to the overheating processor core when the temperature of the overheating processor core is above the warning threshold;
determine whether the temperature of the overheating processor core is above a pre-critical threshold;
steer one or more program threads away from the overheating processor core when the temperature of the overheating processor core is above the pre-critical threshold;
determine whether the temperature of the overheating processor core is above a critical threshold;
throttle the overheating processor core when the temperature of the overheating processor core is above the critical threshold;
determine whether the temperature of the overheating processor core is above an emergency threshold; and
shut down the overheating processor core when the temperature of the overheating processor core is above the emergency threshold.

13. The system of claim 12, wherein the controller further comprises logic to:
return the one or more program threads to normal operation when the temperature of the overheating processor core falls below the pre-critical threshold.

14. The system of claim 12, wherein the controller further comprises logic to:
instruct a basic input/output system (BIOS) to move at least a portion of system memory away from the overheating processor core in an advanced configuration and power interface (ACPI) table.

15. The system of claim 14, wherein the controller further comprises logic to:
generate a system management interrupt (SMI) to instruct the BIOS.

16. The system of claim 14, wherein the controller further comprises logic to:
notify an operating system (OS) to update the ACPI SRAT.

17. The system of claim 13, wherein the controller further comprises logic to:
generate another SMI in order to restore the SRAT to a configuration prior to the temperature increasing beyond the pre-critical threshold.

18. The system of claim 1, wherein the controller comprises logic to:
monitor the temperature associated with each processor core;
determine whether the temperature of any processor core is above a pre-critical threshold;
steer one or more program threads away from the processor core when the temperature of the processor core is above the pre-critical threshold;
determine whether the temperature of any processor core is above a critical threshold;
throttle the processor core that is above the critical threshold
determine whether the temperature of any processor core is above an emergency threshold; and
shut down the processor core that is above the emergency threshold.

* * * * *